United States Patent
Chen et al.

(10) Patent No.: US 9,841,352 B2
(45) Date of Patent: Dec. 12, 2017

(54) SYSTEM AND METHOD FOR MONITORING GEAR AND BEARING HEALTH

(71) Applicant: UNITED TECHNOLOGIES CORPORATION, Farmington, CT (US)

(72) Inventors: Yan Chen, South Windsor, CT (US); Zaffir A. Chaudhry, S. Glastonbury, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 307 days.

(21) Appl. No.: 14/737,257

(22) Filed: Jun. 11, 2015

(65) Prior Publication Data

US 2015/0369699 A1    Dec. 24, 2015

Related U.S. Application Data

(60) Provisional application No. 62/014,485, filed on Jun. 19, 2014.

(51) Int. Cl.
  *G01M 13/04* (2006.01)
  *G01M 13/02* (2006.01)

(52) U.S. Cl.
  CPC ........ *G01M 13/045* (2013.01); *G01M 13/028* (2013.01)

(58) Field of Classification Search
  None
  See application file for complete search history.

(56) References Cited

U.S. PATENT DOCUMENTS

| | | | | |
|---|---|---|---|---|
| 8,544,331 | B2* | 10/2013 | Liang | G01N 29/14 73/659 |
| 2004/0128083 | A1* | 7/2004 | Wang | B41F 13/0045 702/35 |
| 2015/0122025 | A1* | 5/2015 | Hamilton | G01M 13/04 73/593 |

FOREIGN PATENT DOCUMENTS

EP    1 752 754 A2    2/2007

OTHER PUBLICATIONS

European Search Report for Application No. 15172978.7 dated Dec. 3, 2015.
Amit Aherwar et al.: Vibration Analysis Techniques for Gearbox Diagnostic: A Review, Apr. 1, 2012.
vibration.org, Transient Speed Vibration Analysis—Insights into Machinery Behavior, Dec. 7, 2007.
Eurpoean Office Action for Application No. 15172987.7-1557; dated Feb. 27, 2017; 5 pgs.

(Continued)

*Primary Examiner* — Paul West
*Assistant Examiner* — Mark A Shabman
(74) *Attorney, Agent, or Firm* — Cantor Colburn LLP

(57) ABSTRACT

A method for monitoring a gear and bearing system having at least two inter-meshing gears and at least one bearing includes detecting gear and bearing vibrations with at least one vibration sensor operable to generate a signal representative of the detected gear vibrations. A carrier frequency is identified from the generated signal. A band pass filter is applied to the signal at the carrier frequency to create a filtered signal. An envelope is extracted from the filtered signal to create an extracted signal. A time-frequency analysis is then applied to the extracted signal which allows for identification of degradation of the gears.

16 Claims, 5 Drawing Sheets

(56) References Cited

OTHER PUBLICATIONS

Title: "Rolling Element Bearing Analysis"; Author: Brian P. Graney et al.; ME Technical Paper; Materials Evaluation, vol. 70, No. 1, pp: 78-85; The American Society for Nondestructive Testing, Inc.; Jan. 2012; 8 pgs.

* cited by examiner

SYSTEM AND METHOD FOR MONITORING GEAR AND BEARING HEALTH

CROSS-REFERENCE TO RELATED APPLICATION

This application claims the benefit of priority under 35 U.S.C. §119(e) to U.S. Provisional Application No. 62/014,485, filed Jun. 19, 2014, which is incorporated herein by reference in its entirety.

BACKGROUND OF THE INVENTION

1. Field of the Invention

The present disclosure relates to rotating machinery, and more particularly to monitoring the condition of gears and bearings within a rotating machinery.

2. Description of Related Art

Gearboxes are used to transmit rotational motion in many different types of systems. Gearboxes, for example, gearboxes used on a gas turbine engine, are often desirable to transmit power within a turbine engine in order to reduce the speed of rotating components. A gearbox typically consists of at least one gear set and bearings to enable the gears to rotate. Gears housed within the gearbox are designed to mesh with each other to transmit rotational motion. The most commonly used gears include planetary gears, spur gears, helical gears, bevel gears, worm gears, and rack and pinion gears.

A bearing is a machine element that constrains relative motion between moving parts to only the desired motion. The basic function of bearings is to reduce mechanical friction. Reducing friction allows rotating machinery to run more efficiently since there will be less frictional wear. In addition, reducing friction extends the operating life of the machinery and prevents abrasion burn thereby avoiding mechanical breakdown. Bearings also contribute to lower energy consumption by reducing friction and allowing the efficient transmission of power.

The gears and bearings in rotating machinery may have defects, they may fail over time, or they may simply wear out. For example, the loads and stresses that are imposed on the bearings and gears may exceed acceptable limits, leading to failure or damage to the gears or bearings. The damaged or failed components may be replaced once their existence is known. Alternatively, the teeth may simply begin to wear down through prolonged usage. Gearbox failures are among the most costly and the most frequent component failures, adding significantly to the operation and maintenance costs over the life cycle of the turbine engine.

Vibration analysis is an established non-intrusive technique for monitoring the condition of mechanical components within rotating machines. Generally, components in good condition, e.g., gears with complete sets of teeth, produce smaller amplitude vibrations than components in poor condition, e.g., gears with chipped or missing teeth.

Such conventional methods and systems have generally been considered satisfactory for their intended purpose. However, there is still a need in the art for improved systems and methods for monitoring gear and bearing health. The present disclosure provides a solution for this need.

SUMMARY OF THE INVENTION

A method for monitoring a gear and bearing system having at least two inter-meshing gears and at least one bearing includes detecting gear and bearing vibrations with at least one vibration sensor operable to generate a signal representative of the detected gear/bearing vibrations. A "carrier frequency" which is also the invariant mechanical system or sub-system natural frequency provides much higher visibility into the gear and bearing heath. A carrier frequency is identified from the time-frequency representation of the generated signal by applying a short-time Fourier's transformation or an equivalents algorithm. A narrow band pass filter is applied to the signal at the carrier frequency to create a filtered signal. An envelope is extracted from the filtered signal to create an extracted signal. A time and frequency analysis is then applied to the extracted signal to identify the component and degradation of the gears and bearings.

Specifically, the extracted signal can be analyzed in time and frequency domain. From the time domain, a condition indicator representative of the severity impact force of the gear and bearing can be identified. In the frequency domain, extracting a frequency content can be used to identify a source component of the extracted signal using the known operational frequency, i.e. gear meshing frequency, ball pass frequency, shaft frequency, etc. Identifying the degradation of the gears/bearing can include comparing the condition indicator obtained from the extracted signal to that of a baseline signal.

A rotating machinery monitoring system is also disclosed. The system includes at least one vibration sensor coupled to a gearbox housing having a plurality of gear sets and a plurality of bearings and a processing unit. The processing unit is coupled to the at least one vibration sensor and includes a plurality of program instructions. The program instructions can include receiving a signal representative of the gearbox vibration. The program instructions can further include identifying a carrier frequency from the generated signal and applying a band pass filter at the carrier frequency to create a filtered signal. The program instructions can include extracting an envelope of the filtered signal to create an extracted signal. The program instructions can also include applying time and frequency analysis to the extracted signal to estimate the condition indicator and to identify the source component. It is also contemplated that the program instructions can include identifying degradation of the gears/bearing based on the baseline data and/or any other of the processes described above with respect to the methods.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 3b illustrates an envelope extracted signal of the filtered signal of FIG. 3a;

DETAILED DESCRIPTION OF THE PREFERRED EMBODIMENTS

Figure 1:
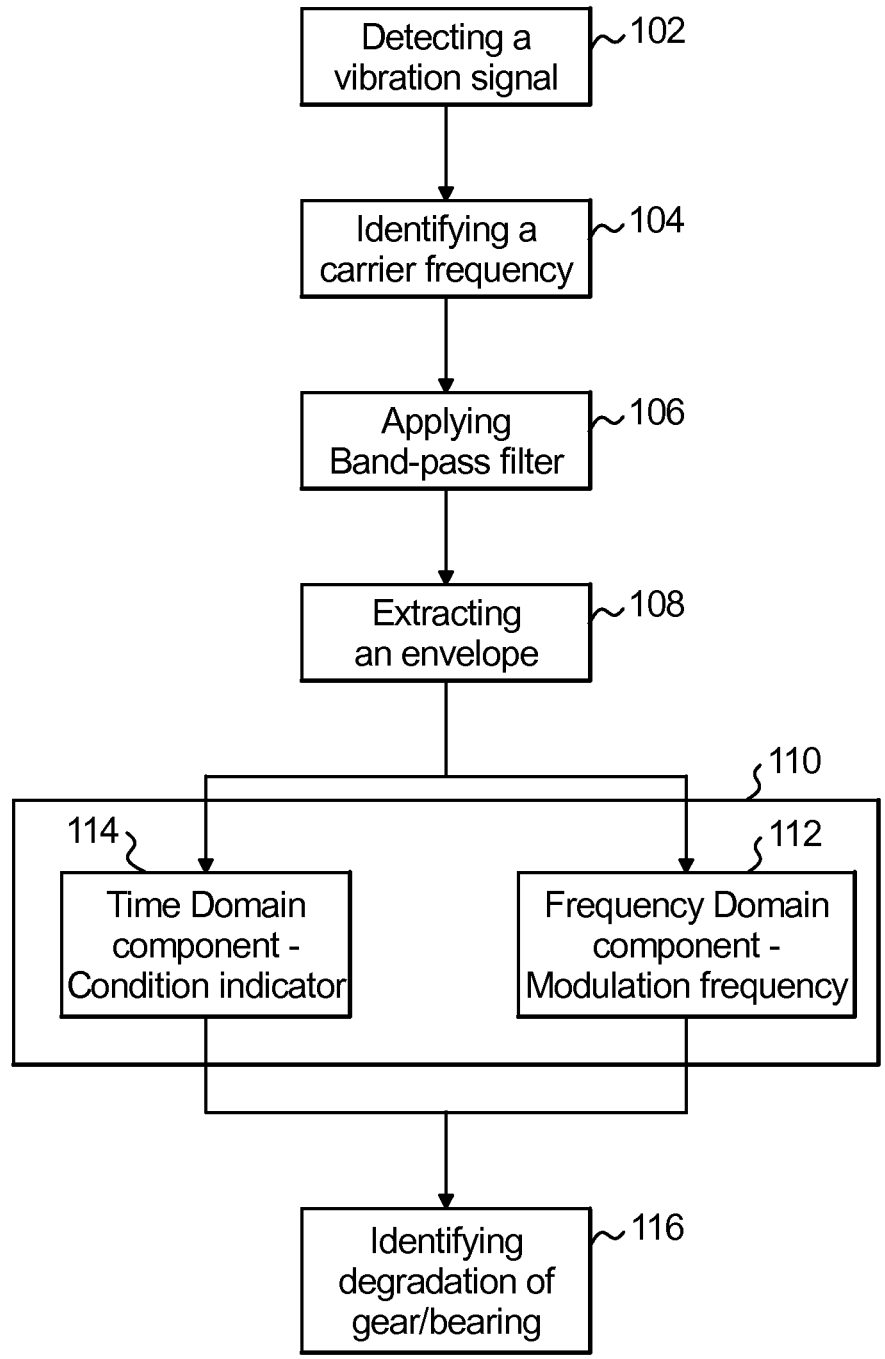
FIG. 1 is a diagram of an exemplary embodiment of a method for monitoring a gear and bearing system constructed in accordance with the present disclosure, showing a process for manipulating a raw vibration signal to determine degradation of the system.

Reference will now be made to the drawings wherein like reference numerals identify similar structural features or aspects of the subject disclosure. For purposes of explanation and illustration, and not limitation, a partial view of an exemplary embodiment of the system and method for monitoring gear and bearing health in accordance with the disclosure is shown in FIG. 1 and is designated generally by reference character 100. Other embodiments of systems and method in accordance with the disclosure, or aspects thereof, are provided in FIG. 2, as will be described.

Gear and bearing defect analysis according to the present disclosure involves processing a vibration signal in a variety of ways to optimize detection of specific defects. More specifically, in a gear and bearing dynamic system, the sudden change of gear meshing stiffness between two gears and the sudden variation of the contact stiffness as a result of the defect in bearing contact surface can trigger an impulse force. Consequently, the impulse force can excite an impulse response. The transient impulse response contains a carrier frequency within it, which is also the mechanical system or sub-system natural frequency that provides much higher visibility into gear and bearing health. As a natural frequency, the carrier frequency is independent of the operational speed and load. In addition the acceleration magnitude of the impulse response is proportional to the magnitude of the impulse force. Moreover, the impulse response event is modulated by the systems' operational frequency, i.e. gear meshing frequency, ball pass frequency and the shaft rotation frequency. The degradation of the gear and bearing leads to a higher variation of the gear meshing stiffness and the bearing contact stiffness, respectively, which will result in higher magnitude of impulse force. Therefore, by monitoring the vibration signal at the carrier frequency, the level of impulse force can be evaluated and the level of degradation between gears and bearings can be determined.

Figure 2:
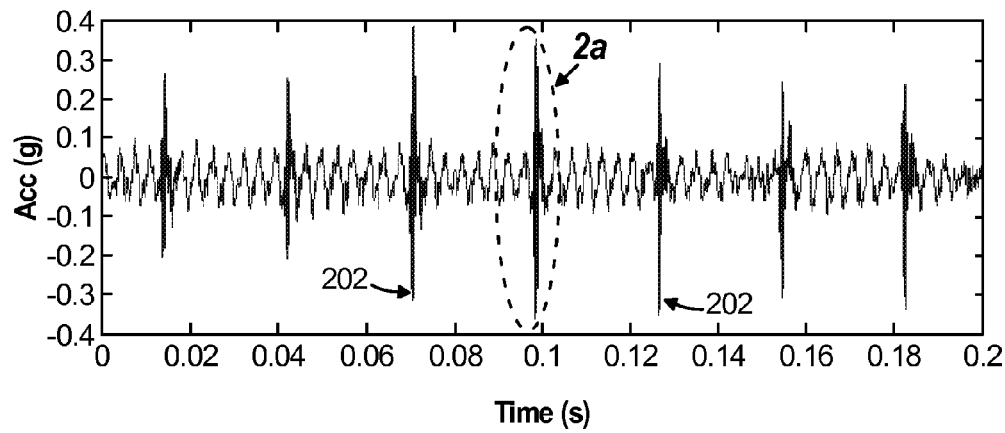
FIG. 2 illustrates an example of a raw vibration signal detected from a sensor within a gear box.
Figure 2A:
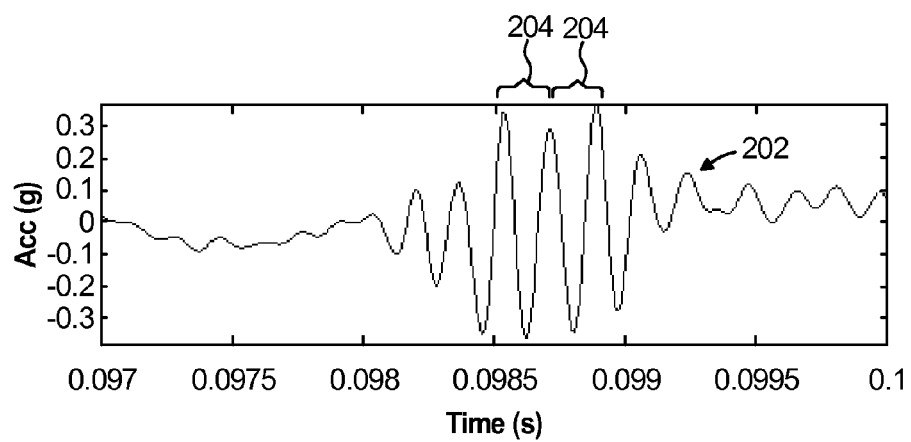
FIG. 2a illustrates a detailed view of the raw vibration signal of FIG. 2

FIG. 1 is a diagram illustrating the method 100 of monitoring gear and bearing health. The method 100 begins at step 102 with detecting gear vibrations with at least one acceleration sensor operable to generate a signal representative of the detected gear vibration. The sensor, for example sensor 602 (shown in FIG. 6), may be an accelerometer or the like, such as a surface mounted transducer which converts vibrations in form of acceleration to electrical output. An example of a raw vibration signal 200 is shown in FIG. 2 illustrating the impact force between at least two gears. More specifically, each burst 202 in the vibration signal 200 is the impulse response of an impact force caused by gear meshing. In the detailed view shown in FIG. 2a of an impulse response 202 each time interval 204 is a unique frequency. More specifically, each time interval indicates the systems' natural frequency, which is the carrier frequency in step 104.

Generally, there are two approaches to identify the carrier frequency at step 104. The first approach is through the ramp speed test, in which the speed is gradually altered from one level to another level with a speed span corresponding to the minimum and maximum operating speed of the machine. The collected vibration is analyzed by the Short-time Fourier's transformation (STFT) or an equivalent time-frequency algorithm. In the resultant time-frequency representation, the carrier frequency can be identified with the "pass-through" resonance and/or the fixed frequency band. The "pass-through" resonance is a phenomenon which occurs when a varying excitation frequency coincides with a system natural frequency for a short duration which causes the system to resonate temporarily. The fixed frequency band is the frequency content that is always present across the time domain in the time-frequency representation, regardless of the speed. The second approach to identify the carrier frequency is through steady-state tests with different speeds. After applying STFT on the collected data, the time-frequency representation is averaged over the time axis to get the averaged spectral magnitude. Then the carrier frequency shows up as a local peak in the averaged spectral magnitude regardless of speed at which data is collected.

Figure 3A:
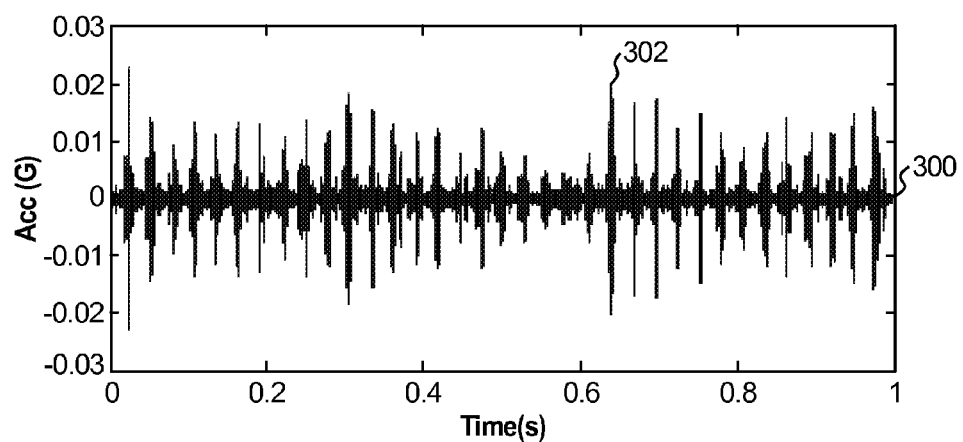
FIG. 3a illustrates a filtered signal at a carrier frequency.
Figure 3B:
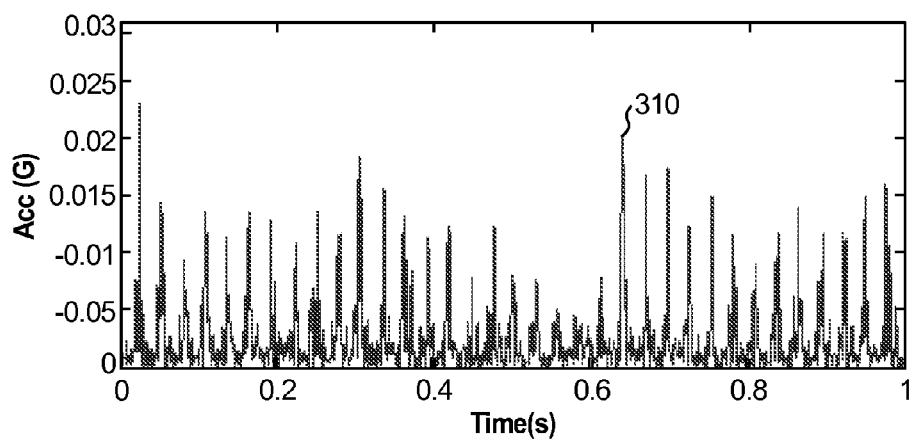
Figure 4:
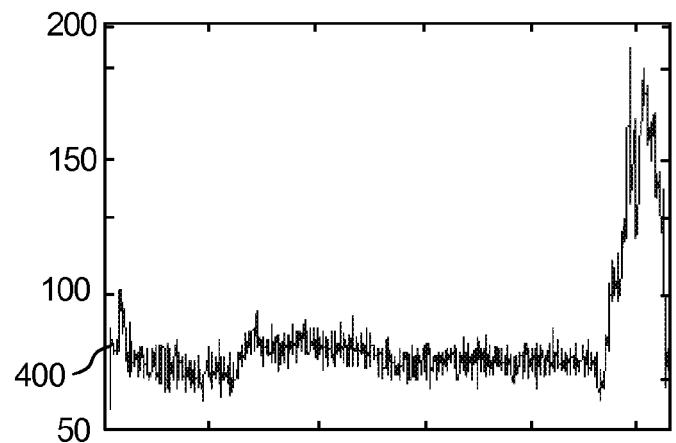
FIG. 4 illustrates time domain versus condition indicator showing severity and impact force within the system.
Figure 5:
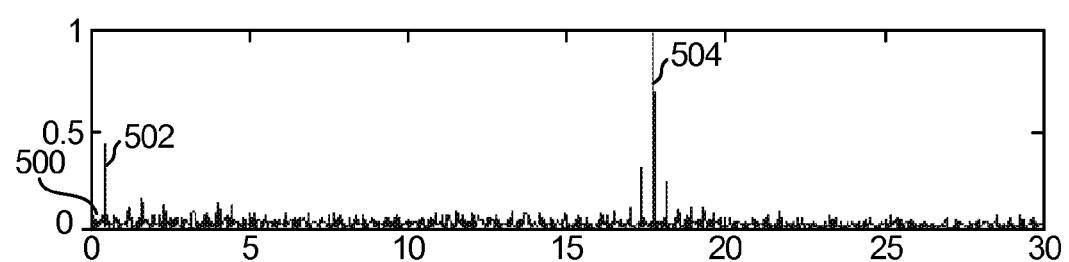
FIG. 5 illustrates frequency domain indicating the source of vibration.

After the carrier frequency is identified, at step 106 a narrow band pass filter is applied to the raw vibration signal 200 at the carrier frequency to create a filtered signal 300. FIG. 3a illustrates an exemplary filtered signal 300 where a band pass filter has been applied at the carrier frequency. In the filtered data 302, the impulse response is outstanding, which is not visible in raw signal 200. Once the band pass filter is applied, at step 108 an envelope function is extracted from the filtered signal to create an extracted signal using Hilbert transformation or other equivalent algorithm. The envelope function outlines the extremities in amplitude of the filtered signal. FIG. 3b illustrates the envelope at a carrier frequency, in which each burst 310 represents an impulse event, i.e. gear meshing and the magnitude of each burst 310 indicates the intensity of the meshing impulse force. Time and frequency analysis is then applied to the extracted signal at step 110. In time domain, the condition indicator of the gear and/or bearing can be extracted from the magnitude of envelope, i.e. Root Mean Square (RMS) Peak-to-peak. The condition indicator is a measurement of the damage severity of the gear or bearing. The exemplary condition indicator trend is illustrated in FIG. 4 showing the time domain 400. In the frequency domain, applying Fast Fourier's Transformation to the envelopes, the modulation frequencies are obtained as showing in frequency domain 500. The modulation frequency can be used to determine the source of vibration in conjunction with the known operational frequencies, i.e. gear meshing frequency, ball pass frequency, etc. In the exemplary signal in FIG. 5, two modulation frequencies are confirmed as the gear meshing frequency 502 and a shaft frequency 504; therefore, it indicates the vibration source is from a particular gear on a particular shaft. Accordingly, based on the time domain and frequency domain indicators the severity and source of gear degradation can be identified as in step 112.

Figure 6:
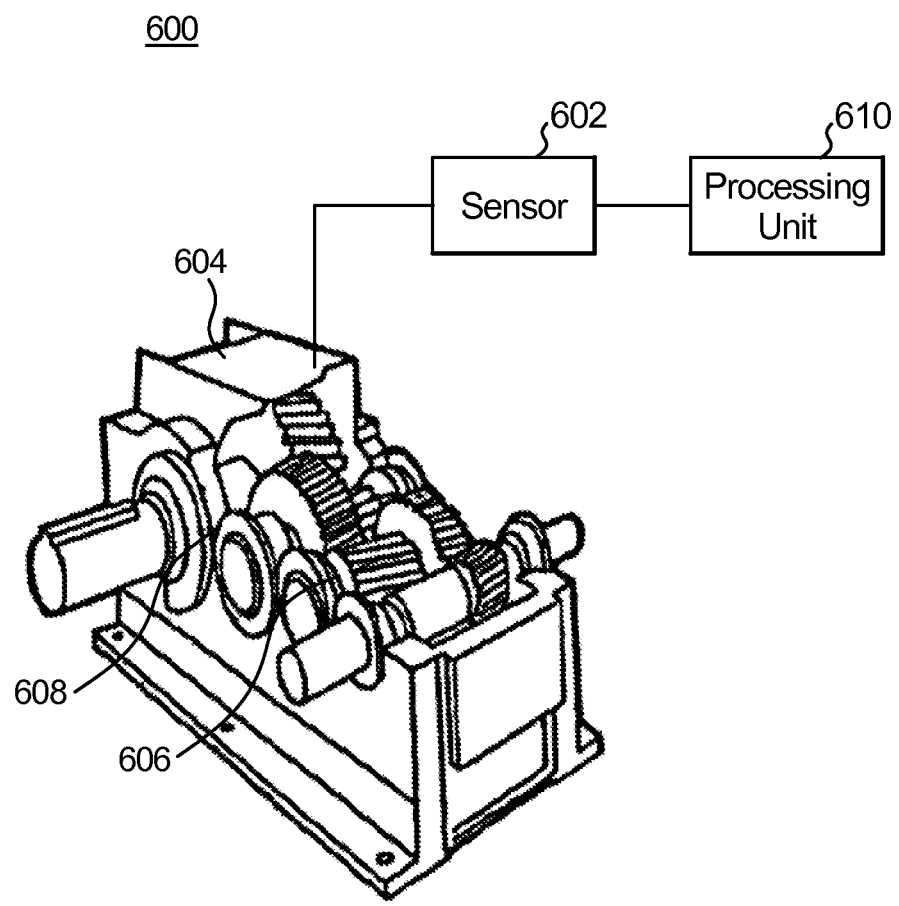
FIG. 6 is a block diagram showing the features of an exemplary embodiment of a system in accordance with this disclosure.

With reference to FIG. 6, a schematic block diagram illustrates the components of a gearbox monitoring system 600. Sensor 602 is coupled to a gearbox housing 604. The gearbox housing includes a plurality of gear sets 606 and a plurality of bearings 608 therein. The sensor 602 is in electronic communication with a processing unit 610. The processing unit includes a plurality of program instructions to identify the source and severity of degradation to the plurality of gears 606.

It will be understood by those skilled in the art that FIG. 6 is intended to provide a brief, general description of an illustrative and/or suitable exemplary environment in which embodiments of the above described present invention may be implemented. FIG. 6 is exemplary of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods and systems of the present disclosure, as described above and shown in the drawings, provide for a system and method with superior properties including monitoring of a gearbox and more specifically, gears and bearings therein. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A method for monitoring a system having at least one rolling element, wherein the at least one rolling element comprises at least two inter-meshing gears and/or at least one bearing, the method comprising:
   detecting vibrations in the at least one rolling element with at least one vibration sensor operable to generate a signal representative of the detected vibrations in the at least one rolling element;
   identifying a carrier frequency by applying a time-frequency transformation to the generated signal, wherein the step of identifying the carrier frequency includes identifying fixed frequency bands of higher amplitude response and invariant with speed across a time domain of a time-frequency representation of a ramp speed test;
   applying a band pass filter at the carrier frequency to create a filtered signal;
   extracting an envelope of the filtered signal to create an extracted signal;
   applying time and frequency analysis to the extracted signal; and
   identifying the component and degradation of the at least one rolling element based on the time frequency analysis.

2. The method of claim 1, wherein the time-frequency transformation is a short time Fourier's transformation.

3. The method of claim 1, wherein the at least one rolling element comprises at least two inter-meshing gears and wherein the step of identifying includes tracking a plurality of gear meshing occurrences to determine severity and magnitude of impact force.

4. The method of claim 1, wherein the step of applying the time and frequency analysis further includes extracting a condition indicator representative of the severity and impact force of the at least one rolling element.

5. The method of claim 1, wherein the step of applying the time and frequency analysis further includes extracting a frequency content to identify a source component of the extracted signal.

6. The method of claim 1, wherein the at least one rolling element comprises at least two inter-meshing gears and wherein the step of identifying degradation of the gears includes comparing the extracted signal to a baseline signal.

7. The method of claim 1, wherein the at least one rolling element comprises at least two inter-meshing gears and at least one bearing.

8. The method of claim 1, wherein the band pass filter is a narrow band pass filter.

9. A method for monitoring a system having at least one rolling element, the at least one rolling element comprising at least two inter-meshing gears and/or at least one bearing, the method comprising:
   detecting vibrations in the at least one rolling element with at least one vibration sensor operable to generate a signal representative of the detected vibrations in the at least one rolling element;
   identifying a carrier frequency by applying a time-frequency transformation to the generated signal, wherein the step of identifying the carrier frequency includes identifying fixed frequency content in the time-frequency representation regardless of speed variation through a steady-state test with different speeds;
   applying a band pass filter at the carrier frequency to create a filtered signal;
   extracting an envelope of the filtered signal to create an extracted signal;
   applying time and frequency analysis to the extracted signal; and
   identifying the component and degradation of the at least one rolling element based on the time frequency analysis.

10. The method of claim 9, wherein the at least one rolling element comprises at least two inter-meshing gears and at least one bearing.

11. The method of claim 9, wherein the band pass filter is a narrow band pass filter.

12. The method of claim 9, wherein the time-frequency transformation is a short time Fourier's transformation.

13. The method of claim 9, wherein the at least one rolling element comprises at least two inter-meshing gears and wherein the step of identifying includes tracking a plurality of gear meshing occurrences to determine severity and magnitude of impact force.

14. The method of claim 9, wherein the step of applying the time and frequency analysis further includes extracting a condition indicator representative of the severity and impact force of the at least one rolling element.

15. The method of claim 9, wherein the step of applying the time and frequency analysis further includes extracting a frequency content to identify a source component of the extracted signal.

16. The method of claim 9, wherein the at least one rolling element comprises at least two inter-meshing gears and wherein the step of identifying degradation of the gears includes comparing the extracted signal to a baseline signal.

* * * * *